United States Patent
Kapelner

(10) Patent No.: US 12,254,704 B2
(45) Date of Patent: Mar. 18, 2025

(54) METHOD FOR DETECTING AN ENVIRONMENT BY MEANS OF IMAGES FROM AT LEAST TWO IMAGE SENSORS

(71) Applicant: Robert Bosch GmbH, Stuttgart (DE)

(72) Inventor: Tamas Kapelner, Hildesheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 70 days.

(21) Appl. No.: 18/351,210

(22) Filed: Jul. 12, 2023

(65) Prior Publication Data

US 2024/0046659 A1 Feb. 8, 2024

(30) Foreign Application Priority Data

Aug. 2, 2022 (DE) ..................... 10 2022 207 989.2

(51) Int. Cl.

| | |
|---|---|
| *G06T 11/00* | (2006.01) |
| *G06T 3/12* | (2024.01) |
| *G06V 10/764* | (2022.01) |
| *G06V 10/774* | (2022.01) |
| *G06V 10/82* | (2022.01) |
| *G06V 20/58* | (2022.01) |
| *H04N 5/265* | (2006.01) |
| *H04N 23/45* | (2023.01) |

(52) U.S. Cl.
CPC ............... *G06V 20/58* (2022.01); *G06T 3/12* (2024.01); *G06T 11/00* (2013.01); *G06V 10/764* (2022.01); *G06V 10/774* (2022.01); *G06V 10/82* (2022.01); *H04N 5/265* (2013.01); *H04N 23/45* (2023.01)

(58) Field of Classification Search
CPC ....................................................... G06T 11/00
See application file for complete search history.

(56) References Cited

U.S. PATENT DOCUMENTS

| | | |
|---|---|---|
| 2019/0004533 A1 | 1/2019 | Huang et al. |
| 2019/0213426 A1 | 7/2019 | Chen et al. |
| 2021/0012567 A1 | 1/2021 | Zhang et al. |

OTHER PUBLICATIONS

Szeliski, Richard: "Image Stitching. Computer Vision," Power Point Presentation, (2008) pp. 1-29; URL:https//courses.cs.washington. edu/courses/cse576/09sp/lectures/Stitching.pdf, [accessed May 2, 2023].

*Primary Examiner* — Y Lee
(74) *Attorney, Agent, or Firm* — NORTON ROSE FULBRIGHT US LLP; Gerard A. Messina

(57) ABSTRACT

A method for detecting an environment using images from at least two image sensors. The method includes: providing a first image of the environment from a first image sensor; providing a second image of the environment from a second image sensor; wherein the first image sensor and the second image sensor are configured to detect the environment with different detection ranges; defining a virtual surface, which is arranged between the environment and the at least two image sensors; generating a virtual overall image on the virtual surface based on a projection transformation of respective pixels of the first image and a projection transformation of respective pixels of the second image from a relevant image plane of the relevant image sensor onto the virtual surface; and representing the environment based on the virtual overall image and on a neural network trained to represent the environment, to detect the environment.

11 Claims, 2 Drawing Sheets

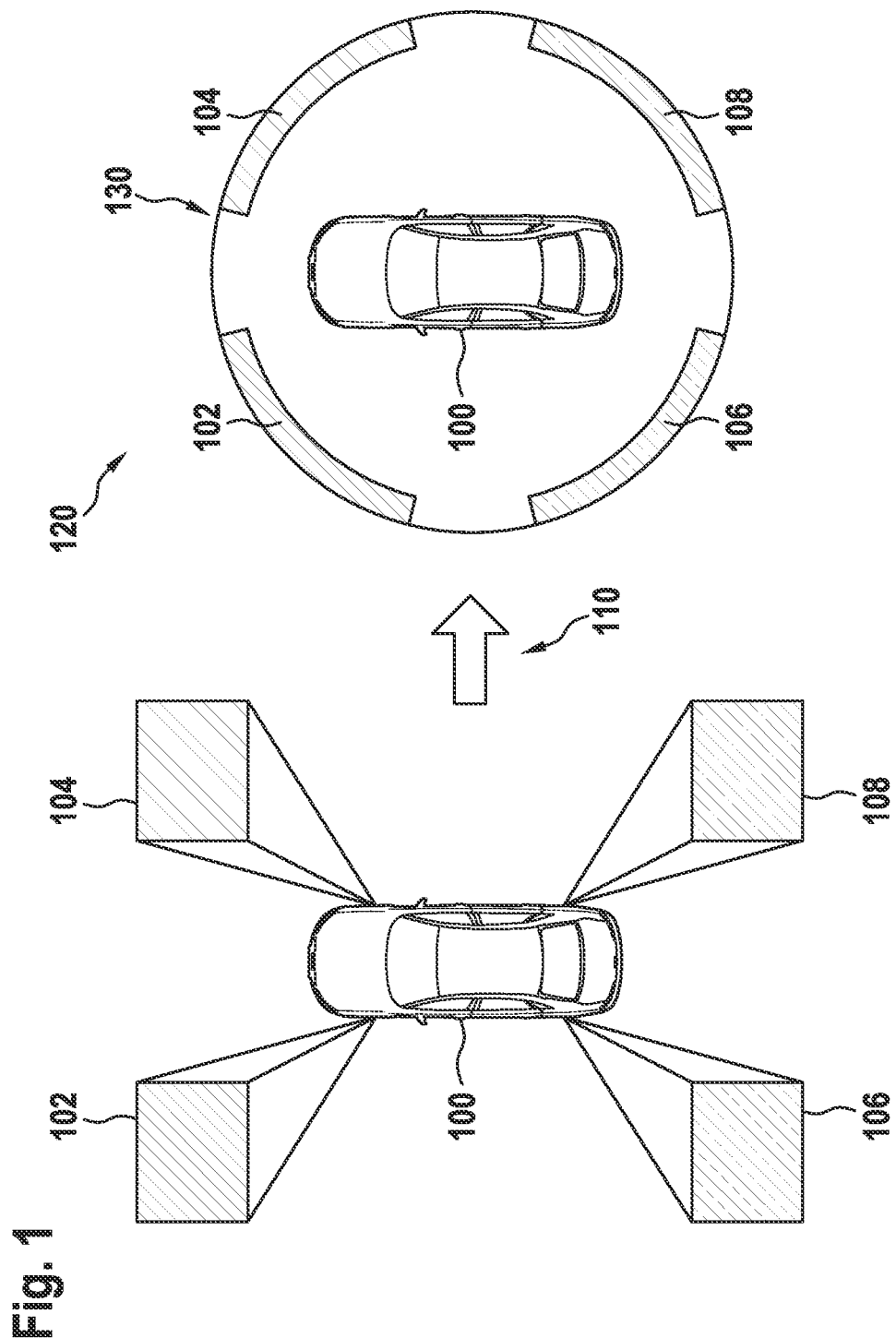

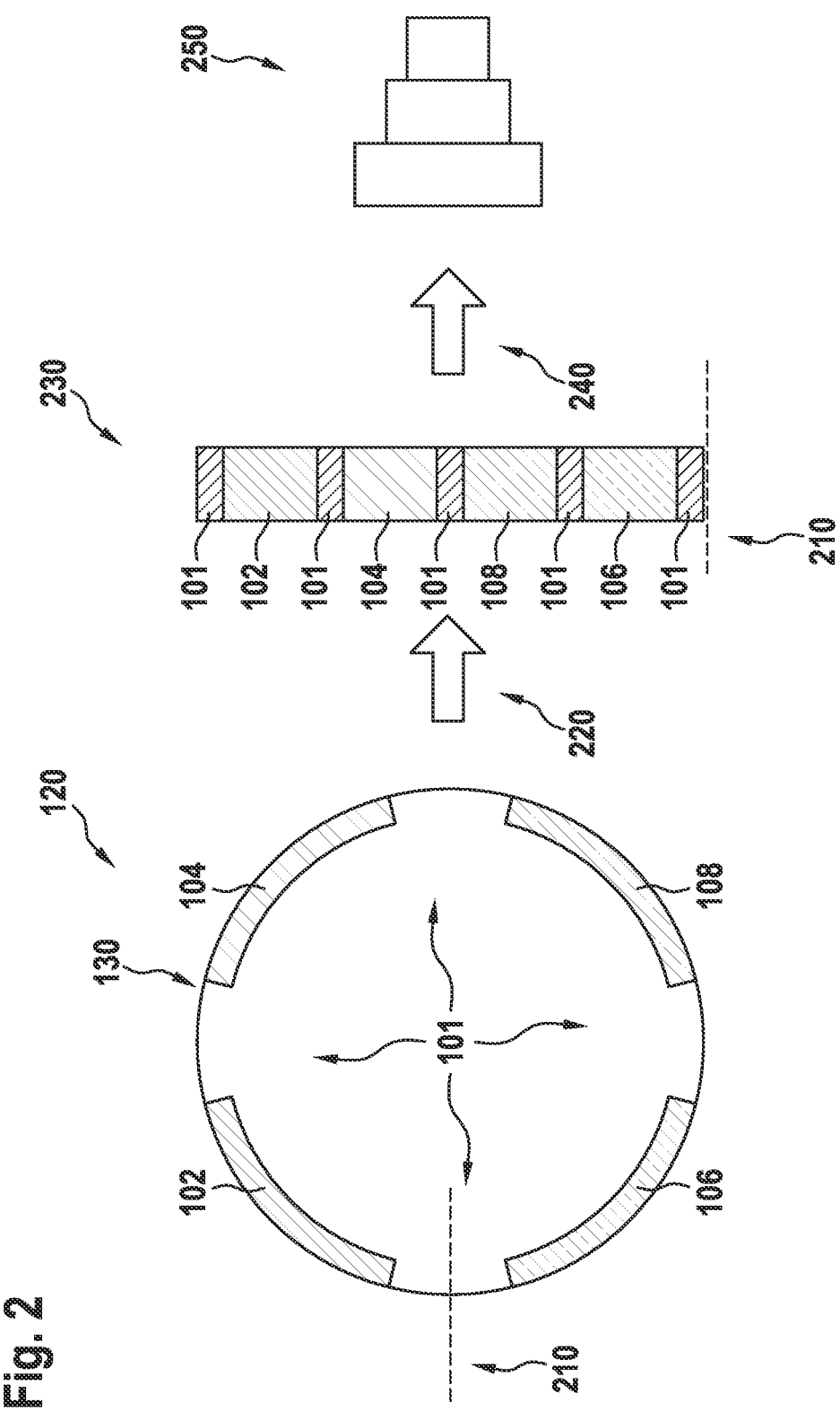

METHOD FOR DETECTING AN ENVIRONMENT BY MEANS OF IMAGES FROM AT LEAST TWO IMAGE SENSORS

CROSS REFERENCE

The present application claims the benefit under 35 U.S.C. § 119 of German Patent Application No. DE 10 2022 207 989.2 filed on Aug. 2, 2022, which is expressly incorporated herein by reference in its entirety.

BACKGROUND INFORMATION

For the control of at least partially automated systems, such as self-driving vehicles or robots, as examples of mobile platforms, safe and effective operation requires interpretation of the environment of the mobile platform for, for example, decision-making processes such as trajectory planning and trajectory control of mobile platforms.

Many image processing tasks for interpretation of an environment, that is, perception of the environment, are based on a plurality of image sensors, such as cameras. Typically, all objects in the environment are placed around an agent, such as a vehicle, a mobile robot or a mobile platform, and are to be detected by means of perception of the environment. For this purpose, the image sensors are usually arranged on the agent in such a way that they can detect the agent's environment. Such an array of image sensors is typically referred to as a multi-camera belt. A highly relevant example is perception of the environment for automated driving, where an autonomous vehicle needs to be aware of all objects around it in order to drive safely. There are several possibilities for the detection of objects in the environment:

- Objects may be recognized by each individual camera and may then be converted into a 3D representation of the environment, and combined in a later step. This is commonly referred to as "late fusion."
- Camera images can be combined first, and then objects can be recognized in a later step; this is typically called "early fusion."
- Any fusion stage between the previous two stages is also possible, for example, combining features extracted from different camera images and using them to detect the environment.

SUMMARY

When objects are detected by means of a plurality of cameras, an assignment of the relevant camera to the relevant object must be determined; that is, the object of how it is recognized whether an object is detected by a plurality of cameras or whether an object changes from a solid detection angle of one camera to a solid detection angle of another camera must be achieved. Typically, a corresponding fusion based on a bird's-eye view representation (BEVR) of the environment is performed; that is, a final result of the fusion is mapped into a view in which the objects of the environment are represented from a top view of the environment. In this representation, three-dimensional information can be detected and the representation enables decisions regarding position, orientation and speed of surrounding objects.

A disadvantage of fusion based on bird's eye view is limited accuracy if the objects are very far away from the agent or image sensor. Furthermore, in such a case, a large amount of memory is usually required for this representation. This is due to the fact that if an object is far away in the bird's eye view, all of the space between the object and the agent must be mapped, in particular if there is no additional information relevant to the detection of the objects there, apart from the relevant distance.

According to the present invention, methods for detecting an environment, a method for training a neural network for detecting an environment, a device for data processing, a mobile platform and a use of a device for data processing according to the features of the present invention, which have at least some of the effects mentioned, are provided. Advantageous embodiments of the present invention are disclosed herein.

Throughout this description of the present invention, the sequence of method steps is shown in such a way that the method is easy to understand. However, the person skilled in the art will recognize that many of the method steps can also be run through in a different order and result in the same or a corresponding result. In this sense, the sequence of the method steps can be changed accordingly. Some features are provided with numbers to improve readability or make the assignment clearer, although this does not imply a presence of certain features.

According to one aspect of the present invention, a method for detecting an environment by means of images from at least two image sensors is provided. According to an example embodiment of the present invention, the method includes the following steps.

In one step, a first image of the environment is provided by a first image sensor, and in a further step, a second image of the environment is provided by a second image sensor, wherein the first image sensor and the second image sensor are configured to detect the environment with different detection ranges.

In a further step, a virtual surface is defined, which virtual surface is arranged between the environment and the at least two image sensors. In a further step, a virtual overall image is generated on the virtual surface, which virtual overall image is based on a projection transformation of respective pixels of the first image and a projection transformation of respective pixels of the second image from a relevant image plane of the relevant image sensor onto the virtual surface. In a further step, the environment based on the virtual overall image and on a neural network trained to represent the environment is represented, in order to detect the environment.

The projection transformation, that is, the transformation rule for the pixels of the relevant image plane of the relevant image sensor, depends on parameters of the relevant image sensor characterizing the image sensor and on parameters of the virtual surface describing the virtual surface.

In principle, for each pixel in the image:

A visual ray in the three-dimensional world is determined which defines the relevant pixel and which depends on the camera used, that is, where in the image the visual ray arrives at what angle.

It is calculated where the visual ray would hit the three-dimensional virtual surface These three-dimensional coordinates are converted to coordinates on the virtual surface.

In the method, according to an example embodiment of the present invention, the virtual surface and/or the virtual overall image can be identical as a whole or over a sequence of steps of the method.

The environment can be an environment of the first image sensor and/or the second image sensor. Alternatively or additionally, the environment can be an environment of a mobile platform and/or of an agent to which at least one of the image sensors, in particular relating to the method, is mechanically coupled.

For example, the image sensor can be a photo camera and/or a video camera and/or an imaging system that generates a two-dimensional characterization of the environment.

The detection range or solid detection angle of an image sensor can characterize a spatial region of the environment, which in particular can be described and/or defined by a solid angle characterizing the spatial region of the environment detected by the relevant image sensor.

According to an example embodiment of the present invention, the virtual surface can be a curved surface, such as in particular a cylindrical surface, which is suitable in terms of its shape and/or its arrangement and/or its extension, so that the environment, in particular of at least one image sensor relating to the method, can be mapped and/or characterized on the curved surface.

The virtual surface can be arranged substantially between objects in the environment and the respective image sensors. In particular, the virtual surface can be arranged symmetrically with respect to a plurality of the relevant image sensors. For example, the virtual surface can be arranged to be symmetrically with respect to the mobile platform comprising the coupled image sensors and/or the agent.

In particular, the curved surface can be arranged in a manner erect on a base surface of the environment.

The virtual surface can be shaped and arranged so that an overall solid-angle range, which arises in a spatially additive manner from the detected solid-angle ranges of the images of the image sensors relating to the method, can be displayed on the virtual surface.

The virtual surface can be arranged and curved in such a way that the respective image sensors and/or a mobile platform and/or an agent are enclosed at least partially or completely, in particular annularly. The virtual surface can include an angular range of 360°, in particular with respect to an angular range parallel to a base surface of the respective image sensors.

For example, the virtual surface can be a cylindrical surface, wherein the cylinder is erect on a base surface of the environment. Alternatively, the virtual surface can be a spherical surface. Alternatively, the virtual surface can be the surface of an ellipsoid.

The virtual overall image can be defined as a structured totality of virtual pixels on the virtual surface. A relevant virtual pixel can be determined, or generated, by a projection transformation of a relevant pixel of the relevant image from the relevant image plane of the relevant image sensor onto the virtual surface.

According to one aspect of the present invention, it is provided that the respective images used in a relevant step of the method are generated by the image sensors within such a small time interval that for detection of the environment, the environment represented by the corresponding plurality of images is sufficiently characterized. That is, the plurality of images provided in a relevant sequence of steps of the method were either generated simultaneously or generated within a short time interval.

A plurality of image sensors can comprise a small number of image sensors, such as two or three image sensors; the plurality can also comprise 100 image sensors, or can comprise a much larger number of image sensors.

The term "based on" is to be understood broadly with respect to the feature that the environment is based on the virtual overall image and on a neural network trained to represent the environment. It is to be understood that the virtual overall image and the neural network trained to represent the environment are used for any determination or calculation of a representation of the environment, although this does not rule out other input variables and/or further method steps also being used for this representation of the environment.

A mobile platform can be understood to be an at least partially automated system which is mobile, and/or a driver assistance system of a vehicle. An example can be an at least partially automated vehicle or a vehicle with a driver assistance system. That is, in this context, an at least partially automated system includes a mobile platform with respect to at least partially automated functionality, but a mobile platform also includes vehicles and other mobile machines including driver assistance systems. Other examples of mobile platforms may include multi-sensor driver assistance systems, multi-sensor mobile robots such as robotic vacuum cleaners or lawn mowers, a multi-sensor monitoring system, a manufacturing machine, a personal assistant or an access control system. Each of such systems can be a fully or partially automated system.

According to one aspect of the present invention, it is proposed that the neural network has a plurality of network layers and the network layers have at least one fully connected layer and/or at least one convolutional layer.

A neural network provides a framework for many different algorithms, for example for machine learning, for collaboration and for processing complex data inputs. Such neural networks learn to perform tasks using examples, typically without having been programmed with task-specific rules.

Such a neural network is based on a collection of associated units or nodes that are referred to as artificial neurons. Each connection can transmit a signal from one artificial neuron to another. An artificial neuron that receives a signal can process it and then activate other associated artificial neurons.

With conventional implementations of neural networks, the signal at a junction of artificial neurons is a real number, and the output of an artificial neuron is calculated by a nonlinear function of the weighted sum of its inputs, or input signals. The connections of artificial neurons typically have a weighting that adjusts as learning progresses. The weighting increases or reduces the strength of the signal at a connection. Artificial neurons can have a threshold so that a signal is output only if the total signal exceeds such threshold.

A plurality of artificial neurons is typically grouped in layers. Different layers may carry out different types of transformations for their inputs. Signals travel from the first layer, the input layer, to the last layer, the output layer, possibly after passing through the layers multiple times.

Complementing the explanations on neural networks, the structure of an artificial convolutional neural network consists of one or more convolutional layers, possibly followed by a pooling layer. The sequence of layers can be used with or without normalization layers (e.g., layer normalization), zero-padding layers, dropout layers and activation functions, such as rectified linear unit (ReLU), sigmoid function, tank function or softmax function.

In principle, these units may repeat themselves as often as desired; if there are enough repetitions, we then speak of deep convolutional neural networks. Such a convolutional neural network can have a sequence of layers that sample the input grids or input signals down to a lower resolution to obtain the desired information and store the redundant information.

According to one aspect of the present invention, it is provided that the projection transformation for generating the virtual overall image is based on the respective camera parameters of the at least two image sensors.

According to one aspect of the present invention, it is provided that the projection transformation is a coordinate transformation in three-dimensional space between the camera plane and the virtual surface.

According to one aspect of the present invention, it is provided that the representation of the environment comprises determining objects of the environment and/or determining a semantic segmentation of the environment and/or determining a classification of a scene of the environment.

In other words, the environment can be represented by means of the trained neural network by, for example, detecting objects in the environment and/or semantically segmenting the respective images.

According to one aspect of the present invention, it is provided that the relevant determination for the representation of the environment is based on the virtual overall image, in particular in order to detect the environment.

According to one aspect of the present invention, it is provided that the neural network trained for representation is trained to determine objects of the environment and/or to determine a semantic segmentation of the environment and/or to determine a classification of a scene, in particular in order to detect the environment.

In other words, according to an example embodiment of the present invention, the method for detecting the environment maps the images of a multi-camera belt, which has a plurality of image sensors, onto a single virtual surface, in particular a cylindrical surface, wherein, in particular, the virtual overall image of the virtual surface can be provided as an input signal to a convolutional neural network. After performing the relevant task, e.g., object recognition by means of a convolutional neural network, the objects can be mapped in a three-dimensional space of the environment. Since the recognition of objects is based on a common representation, namely the representation on a virtual surface, the problem of assigning objects detected by at least two cameras is avoided. In addition to object recognition, the method can of course be used alternatively or additionally for any other image processing task, e.g., semantic segmentation and/or classification of a scene.

Thus, the described method corresponds to a form of early fusion that overcomes the problems associated with bird's-eye view representation; that is, the representation does not require a large number of parameters and does not lose accuracy in recognizing objects if the objects are far away from one of the image sensors.

Since this is an early fusion method, it also at least mitigates the problem of object assignment and object tracking between image sensors that is typically encountered with late fusion techniques. A further advantage is that convolutional neural networks typically used in computer vision can be applied to the common representation, so that no special techniques are required to create a bird's-eye view representation.

A further advantage of the present invention is that the virtual surface onto which the images of the image sensors, such as cameras in particular, are mapped can be maintained when the image sensors are changed, so that the same neural network can be applied to different spatial configurations of a plurality of image sensors, as long as the image sensors are mapped onto the same virtual surface by means of a projection transformation. This also means that this method is robust against random changes of an alignment of the image sensors, e.g., due to physical effects.

In other words, the method can project images from a plurality of image sensors onto a common virtual surface, in particular using conventional mathematical methods, by means of the projection transformation. With this projection transformation, a coordinate transformation in three-dimensional space between the relevant image plane of the relevant image sensor and the freely selectable virtual surface can be calculated and the virtual pixels or virtual pixels of the virtual overall image are defined according to this transformation.

Thus, the respective images from a plurality of image sensors, in particular a multi-camera belt, are mapped onto the virtual surface based on the respective image sensor parameters of the respective image sensors, in order to generate the virtual overall image. The exact location and alignment of the virtual surface, such as a cylindrical plane in particular, on which the images are mapped can be arbitrary and is substantially a hyperparameter of this method. There may be partial regions on the virtual surface, that is, in particular within the virtual overall image, that do not contain information based on the projection transformation. Additionally or alternatively, the virtual surface, or in particular the virtual overall image, can have sub-regions onto which a plurality of images, in particular of different image sensors, are mapped. The relevant virtual pixel of the virtual overall image at which projection-transformed pixels of different image sensors would overlap can be determined, for example, by interpolation of the respective overlapping projection-transformed pixels.

The trained convolutional neural network can be applied to the virtual overall image as an input signal by taking it, or in particular by transforming it, according to a two-dimensional virtual overall image, as an "unrolled" virtual overall image. A periodic padding can be performed at the edges of the two-dimensional virtual overall image, so that one edge side of the "unrolled" two-dimensional virtual overall image is padded with image content of the other edge side, at least for convolution processes within the trained neural network, and accordingly conversely, the other side of the "unrolled" two-dimensional virtual overall image is padded with image content of one side of the two-dimensional virtual overall image.

Regions of the virtual overall image to which no projection-transformed pixels are mapped may be padded with zeros. Alternatively or additionally, regions of the virtual overall image to which no projection-transformed pixels are mapped can be determined using partial convolutional processes within the trained convolutional neural network, in order to accordingly ignore the pixels of these regions for the representation of the environment.

According to one aspect of the present invention, it is provided that the virtual overall image has a plurality of virtual pixels, which are generated by means of the respective pixels of the respective images based on the projection transformation. Alternatively or additionally, virtual pixels, which from pixels of at least two images of different image sensors, which overlap on the virtual surface after the projection transformation, in particular for generating the virtual overall image, may be determined by interpolation.

According to one aspect of the present invention, it is provided that the method is performed using a plurality of image sensors, in particular using a plurality of image sensors of a multi-camera belt, which sensors in each case detect the environment with different detection ranges, and wherein in particular the plurality of image sensors are mechanically coupled to a mobile platform.

According to one aspect of the present invention, it is provided that the virtual surface is a curved surface that extends substantially between objects of the environment and the respective image sensors, so that the environment of the image sensors can be mapped and/or characterized on the curved surface. In particular, the curved surface can be arranged in a manner erect on a base surface of the environment.

According to one aspect of the present invention, it is provided that the virtual surface has at least one axis of symmetry. The respective image planes of the plurality of image sensors may be arranged symmetrically with respect to the at least one axis of symmetry of the virtual surface.

According to one aspect of the present invention, it is provided that the virtual surface has sub-surfaces, wherein a totality of the sub-surfaces for all respective image sensors are arranged in a manner enclosing the respective image sensors. Alternatively, the virtual surface can be arranged enclosingly for all respective image sensors in a manner that is closed, or open, for all respective image sensors.

For example, the virtual surface can be arranged and curved according to a cylindrical surface.

That is, according to one aspect, the virtual surface can be arranged so as to be annularly closed, in particular with respect to a viewing angle parallel to a base surface of the respective image sensors, around the respective image sensors.

According to one aspect of the present invention, it is provided that the virtual surface is exactly one virtual surface that at least partially or completely encloses all respective image sensors.

According to one aspect of the present invention, it is provided that the virtual surface is arranged according to a cylindrical surface and/or is designed or formed according to a cylindrical surface. A cylinder axis of the cylinder surface can be arranged in a manner erect, in particular perpendicularly, on a base surface of the environment.

In other words, this means that the projection transformation of respective pixels of the relevant image of the relevant image sensor onto a cylindrical surface as a virtual surface can be performed by means of a cylindrical projection of images of a multi-camera belt from the relevant image plane onto the cylindrical plane.

It is provided here to detect the environment of image sensors by means of such so-called cylindrical convolutions, applied to a plurality of images.

According to one aspect of the present invention, it is provided that the neural network is a convolutional neural network, and/or the neural network is periodically padded at respective edges of the convolutional neural network, in order to map an enclosing virtual surface, in particular a fully enclosing virtual surface.

Thus, it can be achieved that a 360° rotational invariance of the virtual overall image is mapped with the neural network, and in particular the convolutional neural network. That is, at the respective edges of the convolutional neural network, the 360° periodicity of the virtual overall image can be taken into account in the definition of the convolutional network, and, in particular, an angular range of the virtual overall image on the virtual surface in the edge region of the convolutional network can be taken into account by a periodicity, in particular by mapping the edges by periodic padding.

According to one aspect of the present invention, it is provided that further steps for detecting the environment continue the periodicity of the virtual overall image. That is, for a virtual surface with a periodic structure, such as a virtual surface in the form of a cylindrical surface, in the two-dimensional representation of the cylindrical surface, the image content of the virtual overall image on an outer part on one side and an outer part on another side are identical. In particular, regressions in cylindrical coordinates may implicitly address this problem for cylindrical virtual surfaces.

If the virtual surface embedded in the three-dimensional space is transformed into a two-dimensional representation according to a two-dimensional virtual surface, this transformation for the two-dimensional representation of the virtual surface can determine respective edges of the two-dimensional representation, so that the rotational symmetry of the annularly arranged virtual surface is characterized.

According to one aspect of the present invention, it is provided that the convolutional neural network has at least one layer with partial convolution operations, in order to represent an environment in which sub-regions of the virtual surface do not have virtual pixels after projection transformation of the respective pixels of the images of the respective image sensors has been performed.

By means of partial convolution operations, the neural network can be configured to handle non-existing information regarding sub-regions of the environment based on the virtual overall image and/or the virtual surface.

Typically, partial convolution operations can be used if parts of an image are missing and need to be supplemented. A partial convolutional operation method modifies convolutional operations in such a way that some inputs of a relevant convolutional layer are ignored, in order to make corresponding modified neural networks resistant to missing input information.

According to one aspect of the present invention, it is provided that sub-regions of the virtual overall image on which no projection-transformed pixel falls, that is, in particular, gaps in the virtual overall image, are each padded with zeros, in order to produce a representation of the virtual overall image that is suitable for the neural network as an input signal.

According to one aspect of the present invention, a method for training a neural network for detecting an environment of at least one image sensor based on images of the at least one image sensor is proposed, wherein a virtual surface arranged between the environment and the at least one image sensor is defined. According to an example embodiment of the present invention, the neural network can be trained with a plurality of training cycles and with the following steps in each training cycle.

In one step of the training cycle, a representation of a ground truth environment of the at least one image sensor can be provided. In a further step of the training cycle, an image of the environment of the at least one image sensor can be provided. In a further step, a virtual overall image of the environment of the at least one image sensor on the virtual surface can be generated based on a projection transformation of the respective pixels of the image of the environment of the at least one image sensor from a relevant image plane of the relevant image sensor onto the virtual surface. In a further step of the training cycle, the environment based on the virtual overall image of the image of the environment of the at least one image sensor can be represented by means of the neural network. In a further step, at least one deviation of the relevant environment represented by the neural network from the relevant represented ground truth environment can be determined. The "ground truth environment" can also be mapped onto the virtual surface. For example, ground truth bounding boxes of the respective images; these can be projected onto the virtual surface. For at least some of the training cycles, the neural network can be adapted to minimize a deviation of the environment represented by the neural network from the ground truth environment.

The ground truth environment can be described by facts that have been observed or measured and may be objectively analyzed.

In other words, the neural network can also be trained with parts of the representation of the ground truth environment on the virtual surface, which in particular is a cylindrical surface. This means that individual images from individual image sensors may also be used. Then, these individual images may be mapped onto the virtual surface, as a result of which only a sub-region of the virtual surface or only a part of the virtual overall image is accordingly trained. It can be taken into account that specific features, in particular of a closed virtual surface, require adjustment, such as periodic padding at the edge of the two-dimensional virtual surface, or of the overall two-dimensional virtual overall image. In addition, the neural network must be adjusted to correctly assign missing and/or overlapping projection-transformed pixels when training exclusively with individual images from individual image sensors.

When training neural networks, a distinction is typically made between a training phase and a test phase, which is also called the propagation phase. In the training phase, which consists of a plurality of training runs, the neural network learns using a training data set. Accordingly, weightings between individual neurons are usually modified. Learning rules specify the manner in which the neural network makes these changes.

With supervised learning, the correct output is given as a "teaching vector" that is used to optimize the parameters of the neural network or the weightings, such as the weightings of a convolution kernel.

In the test phase, on the other hand, no parameters or weightings are changed. Instead, on the basis of the already modified weightings from the training phase, there is an examination here as to whether the network has learned correctly. To do this, data is presented to the input of the neural network and it is checked what output the neural network determines. The output stimuli already shown to the neural network can be used to check whether the neural network has detected the training material.

By presenting new stimuli, it can be determined whether the network is solving the tasks in a generalizing manner.

A cost function (loss) measures how well a given neural network solves a given problem. When training a neural network, the weightings are gradually changed so that the cost function becomes minimal.

For an application of the backpropagation algorithm that can be used to adapt the parameters of the neural environment network, the cost function (loss) can be defined as a sum of the squared difference in pixels between the tensor output by the relevant neural environment network and a tensor representing the external environment model.

According to one aspect of the present invention, for the method for training the neural network, it is proposed that the representation of the environment comprises the determination of objects of the environment and/or a semantic segmentation of the environment and/or classification of a scene of the environment based on the virtual overall image, in particular in order to detect the environment. Alternatively or additionally, the neural network trained for representation is trained to determine semantic objects of the environment and/or to determine a semantic segmentation of the environment and/or to determine classification of a scene, in particular in order to detect the environment.

According to one aspect of the resent invention, for the method for training the neural network, it is proposed that a plurality of images from a plurality of image sensors, in particular a plurality of image sensors of a multi-camera belt, is provided in order to generate the virtual overall image. The generation of the virtual overall image of an environment of the plurality of image sensors on the virtual surface, is then based, accordingly, on the projection transformation of respective pixels of respective images of the plurality of image sensors from a relevant image plane of the respective image sensors onto the virtual surface.

Alternatively or additionally, the plurality of image sensors can be mechanically coupled to a platform, in particular to a mobile platform. The plurality of image sensors can be configured to generate and provide images that were generated simultaneously in a sufficiently accurate synchronization of the environment for detecting the environment.

According to one aspect of the present invention, it is provided for the method for training the neural network that in the relevant training cycle, a second image of the environment is provided by a second image sensor with which the virtual overall image is generated, and the first image sensor and the second image sensor are configured to detect the environment with different detection ranges.

This means that the neural network can be trained to represent the environment both with images from individual image sensors and with images from a plurality of image sensors.

According to one aspect, for the method for training the neural network, it is proposed that a virtual pixel of the virtual overall image, which pixel is generated from pixels of at least two images of the environment of different image sensors, and the pixels of at least two images, which overlap on the virtual surface of the virtual overall image after the projection transformation, are determined by interpolation of the respective projection-transformed pixels of the at least two images of different image sensors.

According to one aspect of the present invention, for the method for training the neural network, it is provided that the neural network is a convolutional neural network and in particular the neural network has at least one convolutional layer and, in at least one training run, at least one convolutional operation is performed by means of the convolutional layer.

According to one aspect of the present invention, a device for data processing to detect an environment is provided, which device has an input for providing at least a first image of the environment of a first image sensor and a second image of the environment of a second image sensor. The device for data processing additionally has a computing unit and/or a system-on-chip, wherein the computing unit and/or the system-on-chip is configured to perform one of the methods described above based on a trained neural network. Additionally, the data processing device has an output for providing a representation of the environment, in order to detect the environment.

According to one aspect of the present invention, it is provided that the device for data processing is used to calculate, from images or videos captured by a multi-camera belt, a control signal for controlling a physical system, such as a computer-controlled machine, a robot, a vehicle or a domestic appliance. For this purpose, the respective images of the respective image sensors may be classified in order to identify objects and/or to segment the respective images semantically. Segmenting images or identifying objects can relate in particular to traffic signs and/or road surfaces and/or pedestrians and/or vehicles and/or other image processing tasks.

Advantageously, using the device for data processing, which is based on the above-described method for detecting an environment, the environment can be easily detected even if the detection is based on a plurality of images from image sensors arranged in particular so that the environment of an actor, such as a vehicle or a mobile platform or a mobile robot, is to be detected.

Using such a device for data processing, the above-described method for detecting an environment can be easily integrated into different systems According to one aspect of the present invention, a mobile platform, and in particular an at least partially automated vehicle, is proposed, which has a device for data processing as described above.

According to one aspect of the present invention, a use of a device 13 for data processing as described above for representing an environment is proposed.

According to a further aspect of the present invention, a computer program is proposed, which comprises instructions that, when the computer program is executed by a computer, cause the computer program to perform one of the above-described methods for detecting an environment by means of images from at least two image sensors. Such a computer program allows the use of the described method in different systems.

According to one aspect of the present invention, a machine-readable storage medium is proposed, on which the above-described computer program is stored. The computer program described above is transportable by means of such a machine-readable storage medium.

According to one aspect of the present invention, a method is proposed in which, based on a representation of an environment of image sensors described above, a control signal for controlling an at least partially automated vehicle is generated; and/or based on the representation of the environment of a mobile platform, a warning signal for warning a vehicle occupant is generated.

BRIEF DESCRIPTION OF THE DRAWINGS

Exemplary embodiments of the present invention are shown in FIGS. 1 and 2 and are explained in more detail below.

FIG. 1 shows an outline in a top view of an environment of a mobile platform with four image sensors, each with a different detection range, schematically illustrating a method for detecting an environment with a virtual overall image.

FIG. 2 shows, in outlined form, further steps for detecting an environment with a virtual overall image in a top view of an environment of a mobile platform with four image sensors.

DETAILED DESCRIPTION OF EXAMPLE EMBODIMENTS

FIG. 1 schematically outlines a method for detecting an environment by means of provided images from four image sensors 102, 104, 106, 108 of a mobile platform 100, wherein the four image sensors 102, 104, 106, 108 are configured to detect the environment of the mobile platform 100 with different detection ranges.

A cylindrical virtual surface 130 is defined, which is symmetrically arranged about the mobile platform 100 between the environment and the image sensors 102, 104, 106, 108. Based on a projection transformation 110 of respective pixels of respective images 102, 104, 106, 108 and a projection transformation of respective pixels from a relevant image plane of the relevant image sensor 102, 104, 106, 108 onto virtual surface 130, a virtual overall image 120 is generated.

FIG. 2 schematically outlines how the cylindrical virtual surface 130 with the virtual overall image 120 is unraveled and "unrolled" 220 at a location 210 to generate a two-dimensional virtual surface 230. By applying 240 the neural network 250 trained to represent the environment to the two-dimensional virtual surface 230, the environment can be represented in order to detect the environment of the mobile platform 100.

In addition, FIG. 2 outlines the sub-regions 101 of the virtual overall image 120 to which no pixels of the respective images are projection-transformed are also mapped onto the two-dimensional virtual overall image 230. These sub-regions 101 may be padded with zeros, or may be considered for a representation of the environment via partial convolution operations of the trained neural network 250. By means of the trained neural network 250, for example, object recognition for the representation of the environment can be performed in order to represent the environment.

What is claimed is:

1. A method for detecting an environment using images from at least two image sensors, comprising the following steps:

providing a first image of the environment from a first image sensor of the at least two image sensors;

providing a second image of the environment from a second image sensor of the at least two image sensors, wherein the first image sensor and the second image sensor are configured to detect the environment with different detection ranges;

defining a virtual surface, which is arranged between the environment and the at least two image sensors;

generating a virtual overall image on the virtual surface based on a projection transformation of respective pixels of the first image and a projection transformation of respective pixels of the second image from a relevant image plane of the relevant image sensor onto the virtual surface; and representing the environment based on the virtual overall image and on a neural network trained to represent the environment, to detect the environment.

2. The method according to claim 1, wherein:

the virtual overall image has a plurality of virtual pixels, which are generated using the respective pixels of the respective images based on the projection transformation; and/or virtual pixels from pixels of at least two images of different image sensors which overlap on the virtual surface after the projection transformation for generating the virtual overall image, are determined by interpolation.

3. The method according to claim 1, wherein the at least two image sensors include a plurality of image sensors of a multi-camera belt, which each detect the environment with different detection ranges; and the plurality of image sensors being mechanically coupled to a mobile platform.

4. The method according to claim 1, wherein:
the virtual surface has sub-surfaces, and a totality of the sub-surfaces are arranged enclosingly for all respective image sensors; or
the virtual surface is arranged enclosingly for all respective image sensors in a manner that is closed, or open, for all respective image sensors.

5. The method according to claim 1, wherein the virtual surface is exactly one virtual surface that at least partially or completely encloses all respective image sensors.

6. The method according to claim 1, wherein the virtual surface is arranged according to a cylinder surface and/or the virtual surface is configured according to a cylinder surface and/or a cylinder axis of the cylinder surface is arranged perpendicularly on a base surface of the environment.

7. The method according to claim 1, wherein:
the neural network is a convolutional neural network; or
the neural network is a convolutional neural network and is periodically padded at respective edges of a convolutional neural network to map a fully enclosing virtual surface.

8. The method according to claim 7, wherein the convolutional neural network has at least one layer using partial convolution operations, to represent an environment in which sub-regions of the virtual surface do not have virtual pixels after projection transformation of the respective pixels of images of the respective image sensors has been performed.

9. A device for data processing to detect an environment, the device comprising:
an input configured to provide at least a first image of the environment of a first image sensor and a second image of the environment of a second image sensor;
a computing unit and/or a system-on-chip, wherein the computing unit and/or the system-on-chip is configured to:
provide a first image of the environment from a first image sensor of the at least two image sensors,
provide a second image of the environment from a second image sensor of the at least two image sensors, wherein the first image sensor and the second image sensor are configured to detect the environment with different detection ranges,
define a virtual surface, which is arranged between the environment and the at least two image sensors,
generate a virtual overall image on the virtual surface based on a projection transformation of respective pixels of the first image and a projection transformation of respective pixels of the second image from a relevant image plane of the relevant image sensor onto the virtual surface, and
represent the environment based on the virtual overall image and on a neural network trained to represent the environment; and
an output configured to provide the representation of the environment, to detect the environment.

10. An at least partially automated vehicle, comprising:
a device for data processing to detect an environment pf the vehicle, the device including:
an input configured to provide at least a first image of the environment of a first image sensor and a second image of the environment of a second image sensor;
a computing unit and/or a system-on-chip, wherein the computing unit and/or the system-on-chip is configured to:
provide a first image of the environment from a first image sensor of the at least two image sensors,
provide a second image of the environment from a second image sensor of the at least two image sensors, wherein the first image sensor and the second image sensor are configured to detect the environment with different detection ranges,
define a virtual surface, which is arranged between the environment and the at least two image sensors,
generate a virtual overall image on the virtual surface based on a projection transformation of respective pixels of the first image and a projection transformation of respective pixels of the second image from a relevant image plane of the relevant image sensor onto the virtual surface, and
represent the environment based on the virtual overall image and on a neural network trained to represent the environment; and
an output configured to provide the representation of the environment, to detect the environment.

11. A method of using a device for data processing, comprising the following steps:
providing the device, the device including:
an input configured to provide at least a first image of the environment of a first image sensor and a second image of the environment of a second image sensor;
a computing unit and/or a system-on-chip, wherein the computing unit and/or the system-on-chip is configured to:
provide a first image of the environment from a first image sensor of the at least two image sensors,
provide a second image of the environment from a second image sensor of the at least two image sensors, wherein the first image sensor and the second image sensor are configured to detect the environment with different detection ranges,
define a virtual surface, which is arranged between the environment and the at least two image sensors,
generate a virtual overall image on the virtual surface based on a projection transformation of respective pixels of the first image and a projection transformation of respective pixels of the second image from a relevant image plane of the relevant image sensor onto the virtual surface, and
represent the environment based on the virtual overall image and on a neural network trained to represent the environment; and
an output configured to provide the representation of the environment, to detect the environment; and
using the provided device.

* * * * *